(12) United States Patent
Byun et al.

(10) Patent No.: US 8,089,601 B2
(45) Date of Patent: Jan. 3, 2012

(54) DISPLAY DEVICE AND METHOD OF MANUFACTURING THE SAME

(75) Inventors: Ho-Yun Byun, Hwaseong-si (KR); Jung-Hun Lee, Seoul (KR); Ji-Yoon Jung, Cheonan-si (KR); Jeong-Uk Heo, Seongnam-si (KR); Sung-Hwan Hong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 317 days.

(21) Appl. No.: 12/419,954

(22) Filed: Apr. 7, 2009

(65) Prior Publication Data

US 2010/0103362 A1 Apr. 29, 2010

(30) Foreign Application Priority Data

Oct. 29, 2008 (KR) .................. 10-2008-0106532

(51) Int. Cl.
*G02F 1/1339* (2006.01)
(52) U.S. Cl. ........................................ 349/153
(58) Field of Classification Search .................. None
See application file for complete search history.

(56) References Cited

U.S. PATENT DOCUMENTS

| 6,831,725 | B2 * | 12/2004 | Niiya ........................ 349/153 |
| 7,006,193 | B2 | 2/2006 | von Gutfeld et al. |
| 2003/0137630 | A1 * | 7/2003 | Niiya ........................ 349/153 |
| 2005/0231679 | A1 * | 10/2005 | Kojima ...................... 349/153 |
| 2008/0151172 | A1 * | 6/2008 | Kondo et al. ............... 349/153 |
| 2008/0309866 | A1 * | 12/2008 | Huang et al. ............... 349/153 |

FOREIGN PATENT DOCUMENTS

| JP | 2008-116825 | 5/2008 |
| KR | 10-2007-0046421 | 5/2007 |

* cited by examiner

*Primary Examiner* — Sung Pak
(74) *Attorney, Agent, or Firm* — Innovation Counsel LLP

(57) ABSTRACT

A display device includes a first substrate and a second substrate. The first substrate includes a sealant which is formed on a peripheral area surrounding a display area including a plurality of pixel portions. The sealant includes a photocuring material hardened by multiphoton absorption and a thermosetting material hardened by heat. The second substrate faces the first substrate and is combined with the first substrate by the sealant. Thus, the reliability of manufacturing the display device, the display quality, and the productivity may be improved.

22 Claims, 13 Drawing Sheets

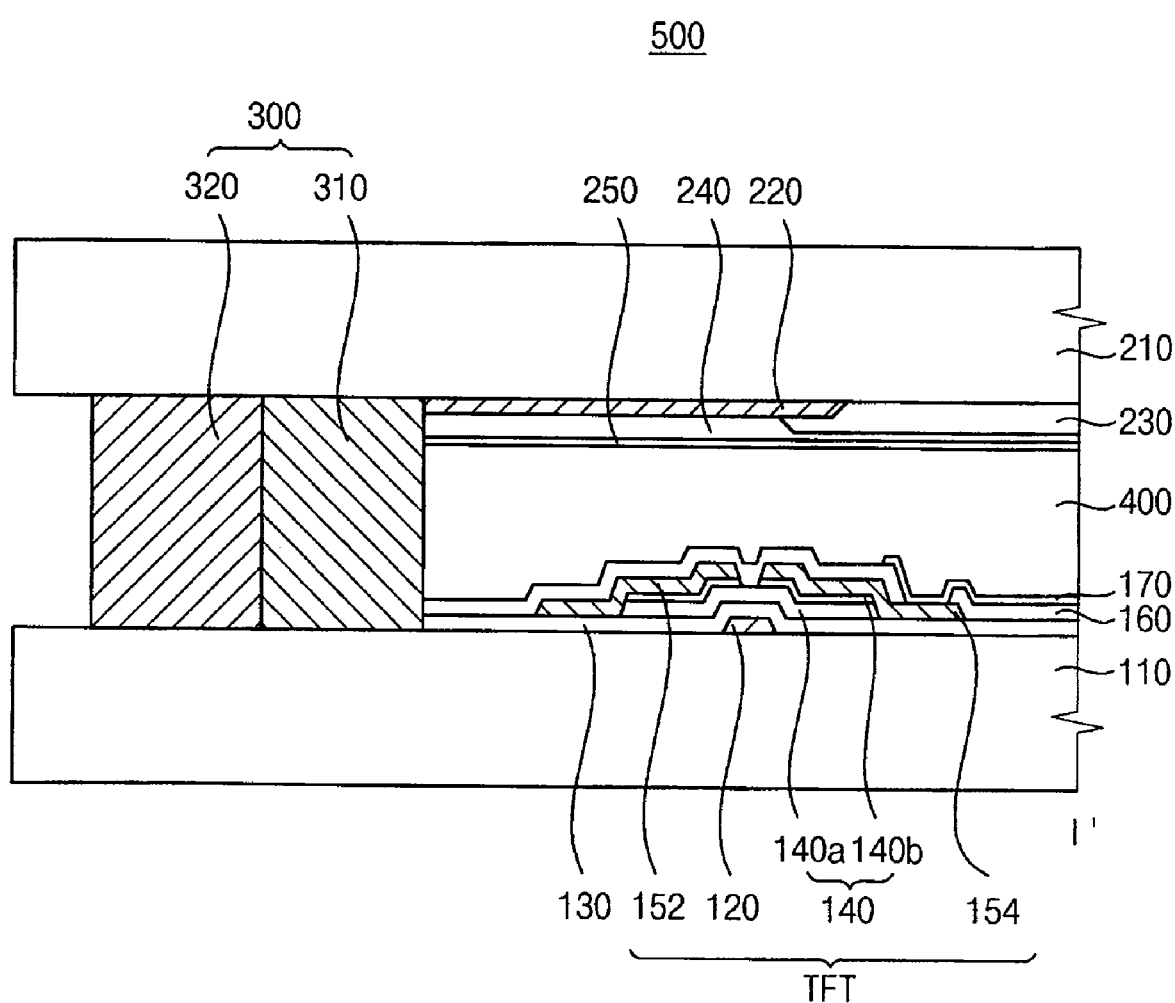

DISPLAY DEVICE AND METHOD OF MANUFACTURING THE SAME

CROSS-REFERENCE TO RELATED APPLICATIONS

This application claims priority under 35 U.S.C §119 to Korean Patent Application No. 2008-0106532, filed on Oct. 29, 2008 in the Korean Intellectual Property Office (KIPO), the contents of which are herein incorporated by reference in their entirety.

BACKGROUND OF THE INVENTION

1. Field of the Invention

Example embodiments of the present invention relate to a display device and a method of manufacturing the display device. More particularly, example embodiments of the present invention relate to a display device used for a liquid crystal display (LCD) device and a method of manufacturing the display device.

2. Description of the Related Art

Generally, a liquid crystal display (LCD) device includes a thin-film transistor (TFT) substrate having a switching element to drive each pixel arranged in a matrix shape, an opposite substrate and a liquid crystal layer. The opposite substrate faces the display substrate and includes a color filter. The liquid crystal layer is interposed between the display substrate and the opposite substrate. An image is displayed on the LCD device according to the light transmittance of the liquid crystal layer, which varies according to a voltage applied thereto.

The LCD device includes a sealant which combines the TFT substrate with the opposite substrate and seals the liquid crystal layer between the TFT substrate and the opposite substrate. The sealant is formed on a peripheral area surrounding a display area of the LCD device to combine the TFT substrate with the opposite substrate. The sealant may directly make contact with the liquid crystal layer in a boundary between the display area and the peripheral area.

A method of forming the liquid crystal layer between the TFT substrate and the opposite substrate may be divided into a dropping method and a vacuum injection method in one example. When the screen size of the LCD device is increased, the dropping process is generally used for forming the liquid crystal layer to improve the simplicity and the reliability of injecting the liquid crystal. In the dropping process, the liquid crystal may be dotted on a first substrate of the TFT substrate and the opposite substrate, and a second substrate of the TFT substrate and the opposite substrate may be combined with the first substrate including the dotted liquid crystal.

In the dropping process, a sealing material which forms the sealant may be hardened after dotting the liquid crystal, and the sealing material may flow into the display area before hardening the sealing material. Thus, the liquid crystal may be easily contaminated by the sealing material in a boundary between the display area and the peripheral area. The display device may display stains generated by the contamination of the liquid crystal, and the display quality may be deteriorated.

SUMMARY OF THE INVENTION

Example embodiments of the present invention provide a display device capable of preventing contamination of a liquid crystal layer by a sealant.

Example embodiments of the present invention provide a method of manufacturing a display device.

According to one aspect of the present invention, a display device includes a first substrate and a second substrate. The first substrate is divided into a display area including a plurality of pixel portions and a peripheral area surrounding the display area, and the first substrate includes a sealant formed on the peripheral area. The sealant includes a photocuring material hardened by multiphoton absorption and a thermosetting material hardened by heat. The second substrate faces the first substrate, and the second substrate is combined with the first substrate by the sealant.

The photocuring material may be formed from a photosensitive sealing material comprising a photosensitive compound and a photoinitiator. For example, the photosensitive compound may include an acrylic resin. The thermosetting material may be formed from a thermal sealing material comprising an epoxy resin.

In one embodiment, the sealant may include a first seal line including the photocuring material, and a second seal line may include the thermosetting material. The second seal line may be formed along an edge of the first seal line.

In some embodiments, the sealant may further include a mixing portion formed between the first and second seal lines. The mixing portion may be formed by mixing the photocuring material with the thermosetting material.

According to one aspect of the present invention, there is provided a method of manufacturing a display device. In the method, a photosensitive sealing material is coated on a peripheral area surrounding a display area of a first substrate. After a thermal sealing material is coated on the peripheral area of the first substrate, the photosensitive sealing material is hardened by using multiphoton absorption. A liquid crystal composition is dropped on the display area of the first substrate including a hardened photosensitive sealing material and the thermal sealing material. A second substrate faces the first substrate which the liquid crystal composition is formed thereon. The thermal sealing material which is interposed between the first and the second substrates is hardened by heat.

In one embodiment, the photosensitive sealing material may include a photosensitive compound having a photosensitive group, and a photoinitiator which initiates the multiphoton absorption of the photosensitive compound to harden the photosensitive compound.

In one embodiment, at least one of the photosensitive sealing material and the thermal sealing material may further include a hybrid compound including a photosensitive group and a thermal group.

In one embodiment, the photosensitive compound of the photosensitive sealing material may include an acrylic resin. The thermal sealing material may include an epoxy resin.

In hardening the photosensitive sealing material, the photosensitive sealing material may receive pulse light to absorb multiphotons. The pulse light may include a lower energy level than a photochemical energy level of the photosensitive sealing material.

The pulse light may have a wavelength in a range of about 400 nm to about 1,200 nm in one example.

According to one aspect of the present invention, there is provided a method of manufacturing a display device. In the method, a mixing composition is coated on a peripheral area surrounding a display area of a first substrate. The mixing composition includes a photosensitive sealing material and a thermal sealing material. The photosensitive sealing material of the mixing composition, which is coated on the first substrate, is hardened by using multiphoton absorption. A liquid crystal composition is dropped on the display area of the first substrate including a hardened photosensitive sealing material and the thermal sealing material. A second substrate faces the first substrate which the liquid crystal composition is formed thereon. The thermal sealing material which is interposed between the first and the second substrates is hardened by heat.

In one embodiment, the mixing composition may further include a hybrid compound comprising a photosensitive group and a thermal group.

In some embodiments, the photosensitive sealing material may include a photosensitive compound including a photosensitive group and a photoinitiator. The photosensitive compound may include an acrylic resin, and the thermal sealing material may include an epoxy resin.

According to some example embodiments of the present invention, contamination of the liquid crystal layer, which is caused by the sealing material, may be prevented, and thus stains displayed on the display device may also be prevented. Thus, the reliability of manufacturing the display device and the display quality may be improved.

Moreover, the photocuring material is formed from the photosensitive sealing material which receives pulse light having a lower energy level than a photochemical energy level of the photosensitive sealing material, and thus change in the circuits or materials formed on the display area and the peripheral area may be prevented by hardening the sealant. Formation of an ultraviolet (UV) blocking mask, which is expensive, may be omitted, and thus the productivity of the display device may be improved.

Additionally, the seal line including the photocuring material may serve as a dam of the liquid crystal and as the cell gap spacer of the first and second substrates. Thus, the margin of dropping the liquid crystal composition may be improved.

BRIEF DESCRIPTION OF THE DRAWINGS

The above and other features and advantages of the present invention will become more apparent by describing in detailed example embodiments thereof with reference to the accompanying drawings.

FIG. 2 is a cross-sectional view taken along a line I-I' shown in FIG. 1;

DETAILED DESCRIPTION OF THE INVENTION

Figure 1:
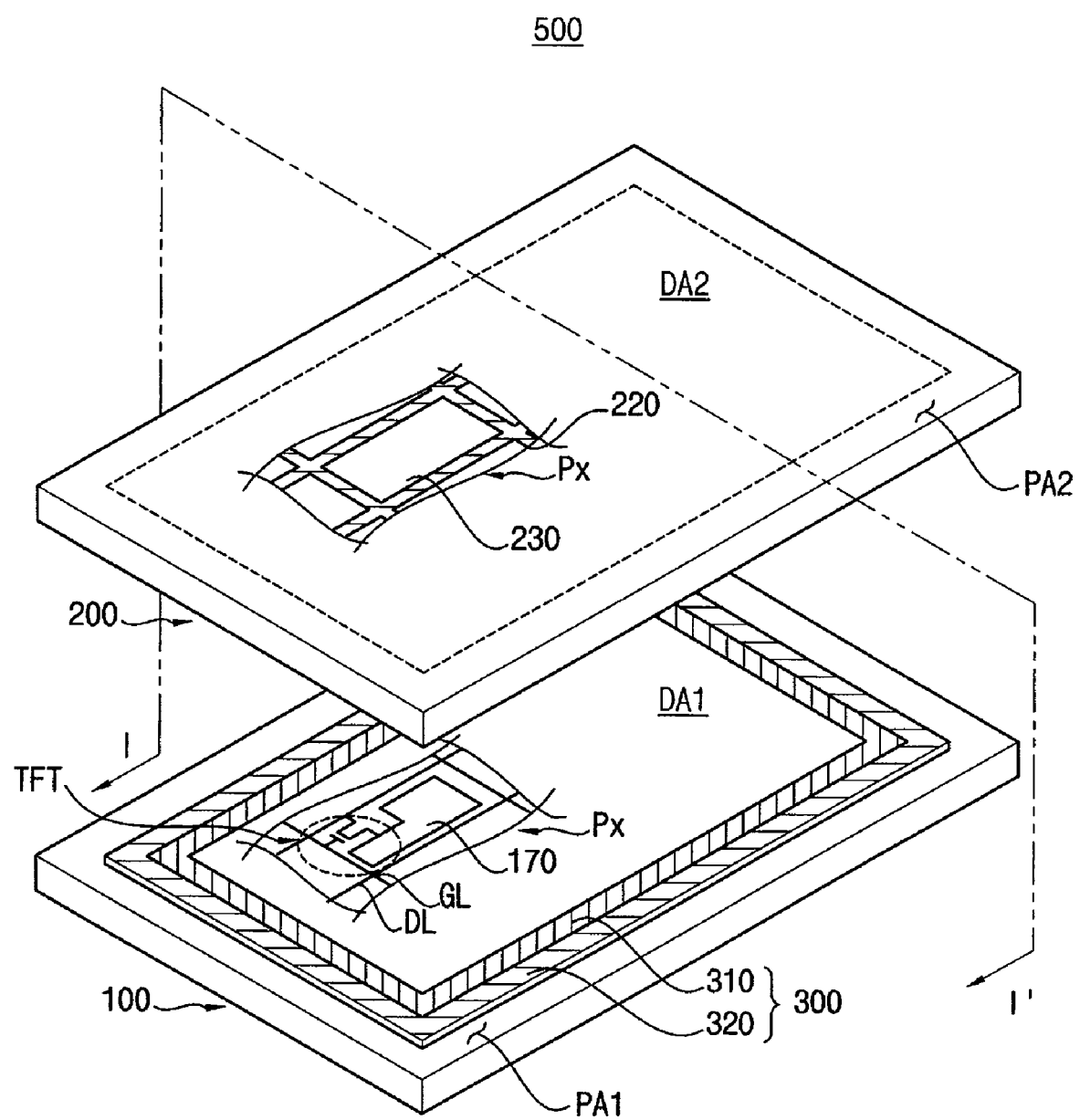
FIG. 1 is an exploded perspective view illustrating a display device in accordance with Embodiment 1 of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Embodiment 1

FIG. 1 is a disassembled perspective view illustrating a display device in accordance with Embodiment 1 of the present invention, and FIG. 2 is a cross-sectional view taken along a line I-I' shown in FIG. 1.

Referring to FIGS. 1 and 2, a display device 500 includes a first substrate 100, a second substrate 200, a sealant 300, and a liquid crystal layer 400. The first substrate 100 and the second substrate 200 may include a plurality of pixel regions Px.

The first substrate 100 may be divided into a first display area DA1 and a first peripheral area PA1 surrounding the first display area DA1. The pixel regions Px of the first display area DA1 may be defined by signal lines GL and DL formed on a first base substrate 110.

Each of the pixel regions Px in the first display area DA1 may include a thin-film transistor (TFT) serving as a switching element, a pixel electrode 170 electrically connected to the TFT, and a storage capacitor (not shown). The signal lines GL and DL may include a gate line GL and a data line DL crossing each other. The TFT may include a gate electrode 120 connected to the gate line GL, a semiconductor pattern 140 formed on a gate insulating layer 130 which covers and overlaps the gate electrode 120, a source electrode 152 overlapped with a portion of the semiconductor pattern 140, and a drain electrode 154 overlapped with a portion of the semiconductor pattern 140. The semiconductor pattern 140 may include a semiconductor layer 140a and an ohmic contact layer 140b. The source electrode 152 may be electrically connected to the data line DL. The pixel electrode 170 may be formed on a passivation layer 160. The passivation layer 160 may cover the source electrode 152 and expose a portion of the drain electrode 154. The pixel electrode 170 may electrically contact the drain electrode 154 to be connected to the TFT.

The second substrate 200 may face the first substrate 100. The second substrate 200 may be divided into a second display area DA2 including a plurality of pixel regions Px and a second peripheral area PA2 surrounding the second display area DA2. Each of the pixel regions Px in the second display area DA2 may be defined by a black matrix pattern 220 which is formed on a second base substrate 210.

Each of the pixel regions Px in the second display area DA2 may include a color filter 230 and a common electrode layer 250. The black matrix pattern 220 may be formed on the second base substrate 210 corresponding to the gate line GL and data line DL of the first substrate 100. The color filter 230 may be formed on the second base substrate 210 corresponding to the pixel electrode 170 of the first substrate 100.

The sealant 300 may be interposed between the first substrate 100 and the second substrate 200. The sealant 300 may combine the first substrate 100 with the second substrate 200. The sealant 300 may be disposed between the first peripheral area PA1 and the second peripheral area PA2.

The sealant may include a photocuring material and a thermosetting material. The photocuring material may be formed by hardening using multiphoton absorption, and the thermosetting material may be formed by hardening using heat.

The photocuring material may be formed from a photosensitive compound including a photosensitive group and a photoinitiator. The photoinitiator may initiate a hardening reaction of the photosensitive compound. The photoinitiator may include an electron donor, an electron acceptor and a pi ($\pi$) bond.

Examples of a material that may be used for the photosensitive compound may include ceramer, polydimethylsiloxane, Epon SU-8 (product, Shell Chemicals, Netherlands), SCR-701 (product, Japanese Rubber Co., Japan), etc. The photosensitive compound may include a net structure. The photosensitive compound may be formed by reacting a hydrogel or a silicate-based acrylate or epoxide. The hydrogel or the silicate-based acrylate or epoxide may be formed from acrylic resin, acryloyl acetone, acryl amide, etc.

Examples of a material that may be used for the photoinitiator may include bis(2,4,6-trimethylbenzoyl)phenylphosphine oxide, 2-methoxy-1,2-diphenylethanone, 2,3-isopropylthioxanthone, diaryl iodonium, triaryl sulfonium salts, etc.

The thermosetting material may be formed using a thermal sealing material including a thermal compound which includes a thermal sensitive group. The thermal sealing material may be hardened by heat to form the thermosetting material.

Examples of a material that may be used for the thermal compound may include phenol resin, amino resin, epoxy resin, urea resin, unsaturated polyester resin, etc.

The sealant 300 may include a first seal line 310 and a second seal line 320 which is formed along the first seal line 310.

The first seal line 310 may include the photocuring material hardened by the multiphoton absorption. The first seal line 310 may be formed on the first peripheral area PA1 surrounding the first display area DA1. The first seal line 310 may be formed adjacent the liquid crystal layer 400.

The second seal line 320 may include the thermosetting material. The second seal line 320 may be formed along an edge portion of the first seal line 310 on the first peripheral area PA1. The second seal line 320 may contact the first seal line 310. The second seal line 320 may be separated from the liquid crystal layer 400 by the first seal line 310.

The liquid crystal layer 400 may be interposed between the first and second substrates 100 and 200. The liquid crystal layer 400 may include a plurality of liquid crystal molecules. An image is displayed on the LCD device 500 according to the light transmittance of the liquid crystal molecules, which varies according to a voltage applied thereto.

FIGS. 3A, 3B, 3C and 3D are perspective views illustrating a method of manufacturing the display device shown in FIG. 1.

Figure 3A:
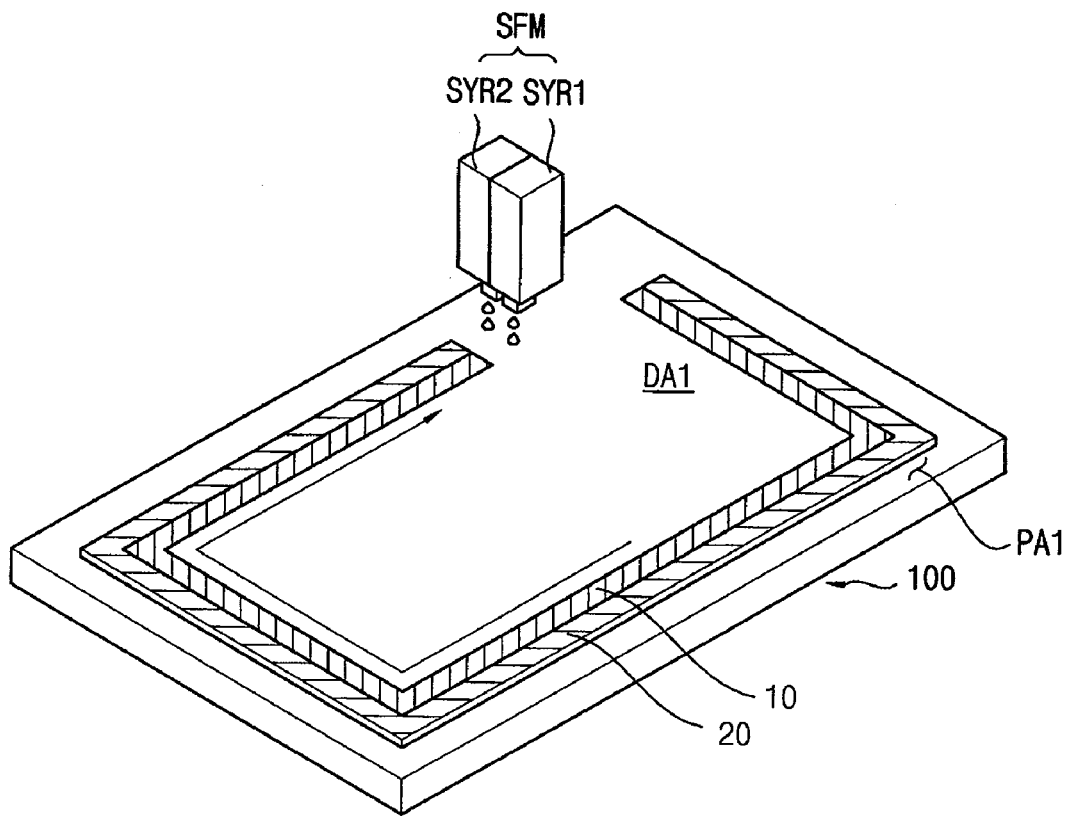
FIGS. 3A to 3D are perspective views illustrating a method of manufacturing the display device shown in FIG. 1.

FIG. 3A is a perspective view illustrating a step of coating the photosensitive sealing material and the thermal sealing material.

Referring to FIG. 3A, the photosensitive sealing material is coated on the first peripheral area PA1 of the first substrate 100 to form a first primary line 10. The thermal sealing material is coated on the first peripheral area PA1 along the first primary line 10 to form a second primary line 20 with the first primary line 10.

In particular, a dispersion device SFM may be disposed over the first peripheral area PA1 of the first substrate 100. The dispersion device SFM may provide the photosensitive sealing material and the thermal sealing material to the first substrate 100. The dispersion device SFM may move along the first peripheral area PA1 to form the first and second primary lines 10 and 20. The first and second primary lines 10 and 20 may not be overlapped with each other. The photosensitive sealing material and the thermal sealing material which are coated on the first substrate 100 may not be mixed with each other.

The dispersion device SFM may include a first syringe SYR1 and a second syringe SYR2. The first syringe SYR1 may disperse the photosensitive sealing material contained in the first syringe SYR1.

Figure 3B:
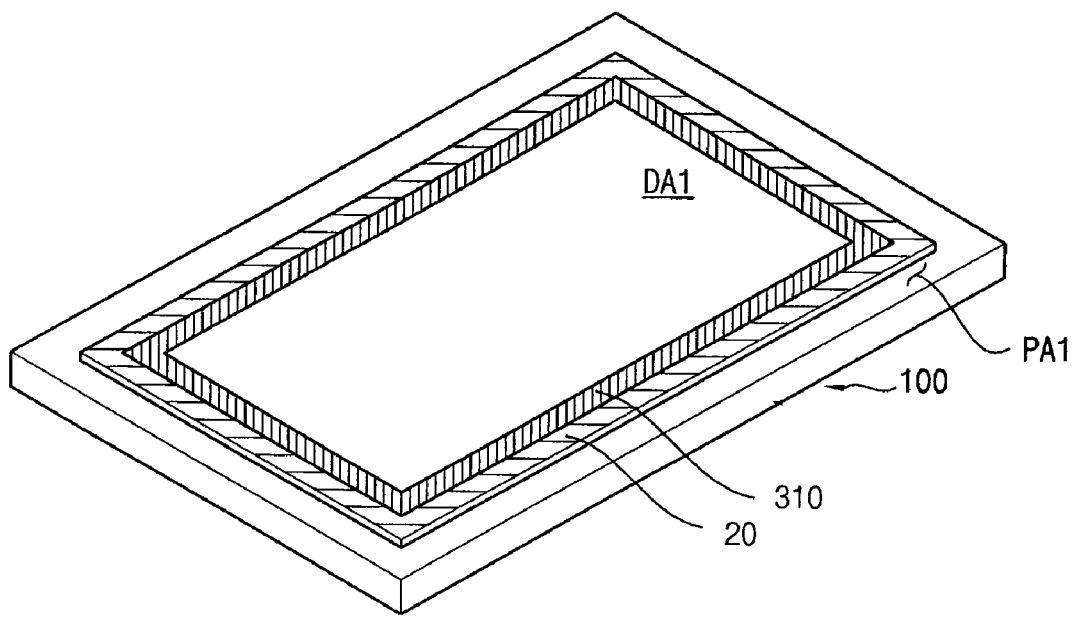

FIG. 3B is a perspective view illustrating a step of hardening the photosensitive sealing material which is coated on the first substrate to form first seal line 310.

Figure 4A:
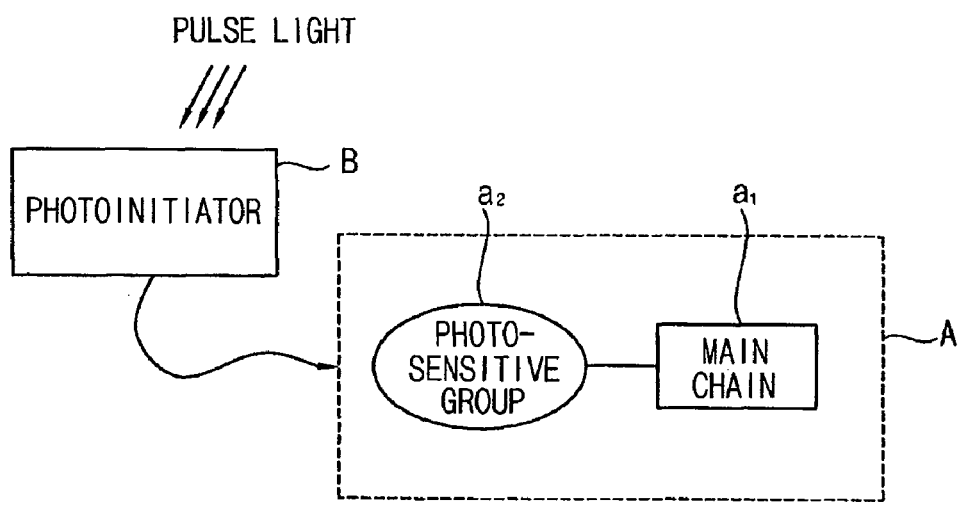
FIG. 4A illustrates a step of hardening a photosensitive sealing material shown in FIG. 3B.
Figure 4B:
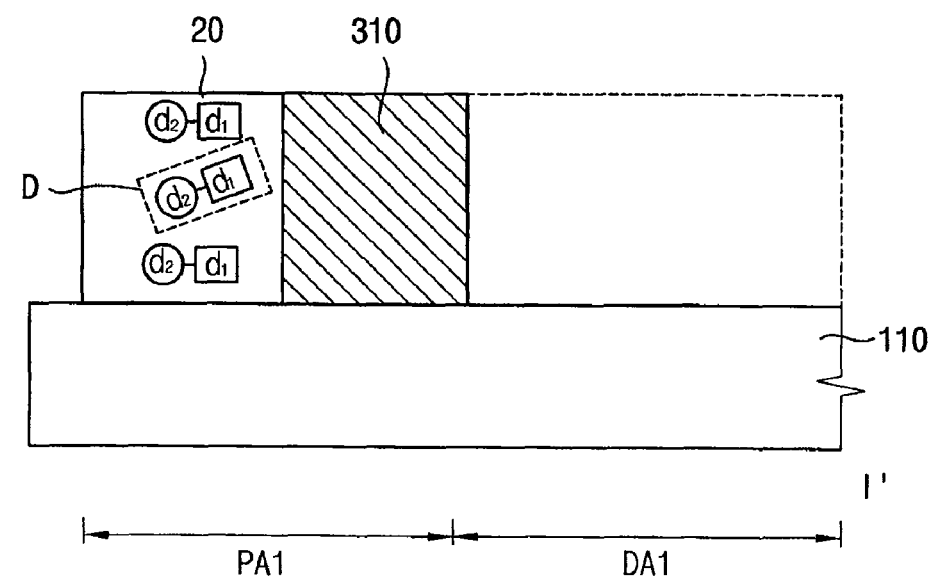
FIG. 4B is a cross-sectional view illustrating a step of hardening the photosensitive sealing material shown in FIG. 3B.

FIG. 4A illustrates the step of hardening the photosensitive sealing material shown in FIG. 3B, and FIG. 4B is a cross-sectional view illustrating a step of hardening the photosensitive sealing material shown in FIG. 3B.

In FIG. 4A, the photosensitive compound of the photosensitive sealing material is indicated as "A", and the photoinitiator is indicated as "B". In FIG. 4B, the thermal compound of the thermal sealing material is indicated as "D".

Referring to FIGS. 3B and 4A, the first primary line 10 may be hardened by the multiphoton absorption to form the first seal line 310. The photosensitive sealing material may be hardened by the multiphoton absorption to form the photo-curing material.

Particularly, the photosensitive compound "A" may include a main chain "$a_1$" and a photosensitive group "$a_2$" combined to the main chain "$a_1$". For example, the photosensitive group "$a_2$" may be an acryl group. The photoinitiator "B" may absorb the photochemical reaction energy (Ex) of pulse light which is generated by a pulse laser in one example. The photoinitiator "B" which absorbs the photochemical reaction energy (Ex) may attack the photosensitive group "$a_2$". Thus, the hardening reaction of the photosensitive compound "A" may be initiated. The photoinitiator "B" may be combined with the main chain "$a_1$" of the photosensitive compound "A" after the photoinitiator "B" initiates the hardening reaction.

According to the above illustrated reaction, the photosensitive sealing material of the first primary line 10 may be hardened to form the first seal line 310 including the photo-curing material.

More particularly, the pulse light having a pulse state may be irradiated along and over the first primary line 10. The pulse light may be irradiated to the first primary line 10 using the pulse laser. The pulse laser may generate the pulse light of femtoseconds ($10^{-15}$ seconds) or picoseconds ($10^{-12}$ seconds). The energy level of the pulse light may be lower than the photochemical reaction energy (Ex) level of the photosensitive sealing material. The photochemical reaction energy (Ex) level may be a photochemical reaction energy level of the photoinitiator "B" of the photosensitive sealing material. The pulse laser may partially provide the pulse light to the first primary line 10.

When one photon of the photoinitiator "B" absorbs the photochemical reaction energy, the pulse light which is generated by the pulse laser may provide a 1/n energy level (Ex/n, "n" presents a natural number greater than or equal to 2) of the photochemical reaction energy (Ex) to the photoinitiator. The photoinitiator may absorb "n" photons from the pulse laser, and each of "n" photons may have the 1/n energy level (Ex/n). Thus, the photoinitiator "B" may substantially absorb the photochemical energy level (Ex) in total, despite receiving the 1/n energy level (Ex/n). When the photochemical reaction energy (Ex) has a wavelength in a range of about 200 nm to about 400 nm, the pulse light has a wavelength in a range of about 400 nm to about 1,200 nm.

For example, when the photochemical reaction energy level of the photoinitiator "B" has a wavelength of about 400 nm, the photoinitiator "B" may absorb two photons, each having a wavelength of about 800 nm, and thus the photoinitiator "B" may substantially absorb about 400 nm in total. In some embodiments, when the photochemical reaction energy of the photoinitiator "B" has a wavelength of about 200 nm, the photoinitiator "B" may absorb three photons each having a wavelength of about 600 nm, and thus the photoinitiator "B" may substantially absorb about 200 nm in total by the multiphoton absorption.

According to above, the hardening reaction of the photosensitive sealing material may be initiated by a low energy, for example, the pulse light having a wavelength of visible light or infrared (IR) light to form the photocuring material. Thus, circuits or materials formed on the first peripheral area PA1 may be protected from change caused by a high energy level, for example, having the wavelength of ultraviolet (UV) light. Moreover, the formation of a UV blocking mask, which is expensive, may be omitted, and thus the productivity and manufacturing efficiencies of the display device may be improved.

Referring to FIG. 4B, the thermal compound "D" of the thermal sealing material in the second primary line 20 may include a main chain "$d_1$" and the thermal group "$d_2$" combined to the main chain "$d_1$". For example, the thermal group "$d_2$" may be an epoxy group.

In hardening the photosensitive sealing material, the thermal sealing material and the thermal compound "D" of the second primary line 20 do not react. However, the first seal line 310 prevents the thermal compound "D" from flowing into the first display area DA1.

Figure 3C:
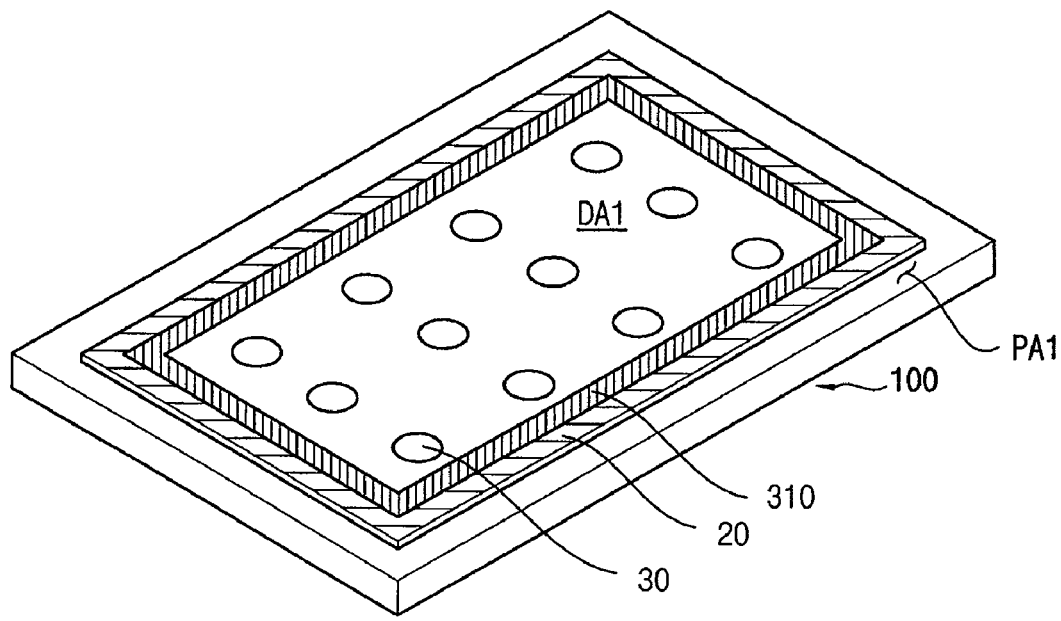

FIG. 3C is a perspective view illustrating a step of dropping the liquid crystal composition. Referring to FIG. 3C, the liquid crystal composition 30 may be dropped on the first display area DA1. The liquid crystal composition 30 may be dotted on the first display area DA1. Because the liquid crystal composition 30 may be dropped on the first substrate 100 including the first seal line 310, the liquid crystal composition 30 may not be mixed with the photosensitive sealing material. The photosensitive sealing material may be hardened to form the photocuring material before dropping the liquid crystal composition, and thus the liquid crystal composition 30 may be prevented from flowing into the first display area DA1.

In spite of a portion of the photosensitive compound in the photosensitive sealing material remaining and not being hardened, and in spite of the liquid crystal composition contacting the first seal line 310, the photoinitiator may be entirely reacted by the pulse light, and thus the liquid crystal composition 30 may not be affected by the photoinitiator.

Additionally, the first seal line 310 may be formed on the first substrate 100 before combining the first substrate 100 with the second substrate 200, and thus the first seal line 310 may serve as a dam preventing material from inflowing into the first display area DA1.

Thus, stains in the display device, which may be generated by contamination of the liquid crystal composition 30 from the photosensitive sealing material and the thermal sealing material, may be prevented.

Figure 3D:
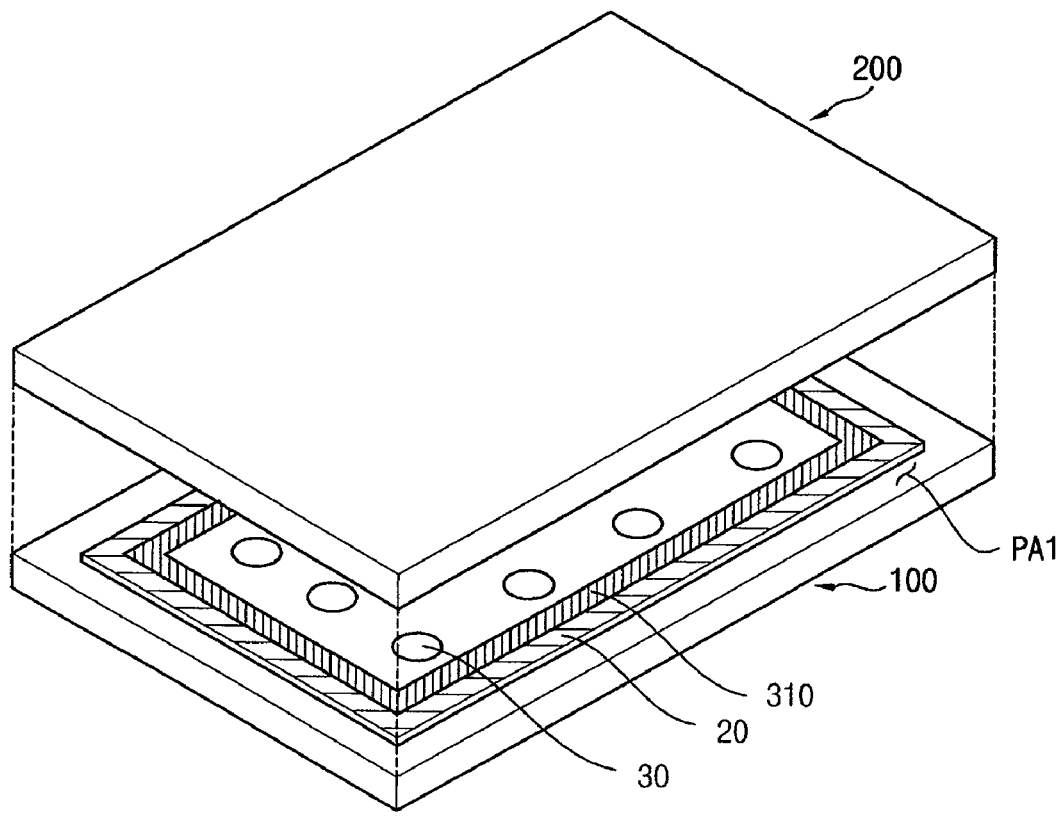

FIG. 3D is a perspective view illustrating a step of arranging the first substrate to face the second substrate and a step of hardening the thermal sealing material.

Referring to FIG. 3D, the second substrate 200 may face the first substrate 100 including a first seal line 310, the second primary line 20 and the liquid crystal composition 30 dropped on the first substrate 100.

When the first substrate 100 and the second substrate 200 face each other, the first seal line 310 may serve as a spacer keeping a gap between the first and second substrates 100 and 200. The gap may be substantially the same as the height of the first seal line 310.

When the first substrate 100 and the second substrate 200 face each other, the thermal sealing material may flow due to a pressure received between the first and second substrates 100 and 200. However, the first seal line 310 prevents the thermal sealing material from flowing into the first display area DA1.

The first and second substrates 100 and 200 may be heated by heat to harden the second primary line 20.

The thermal sealing material may be hardened by the heat to form the second seal line 320 including the thermosetting material. Thus, the second seal line 320 may substantially and physically combine the first substrate 100 with the second substrate 200 to manufacture the display device 500 (FIGS. 1 and 2).

Embodiment 2

A display device in accordance with another embodiment is substantially the same as the display device shown in FIGS. 1 and 2. Thus, any repetitive description will be omitted.

A method of manufacturing a display device in accordance with a second embodiment is substantially the same as the method shown in FIGS. 3A, 3B, 3C and 3D, except for hardening a photosensitive sealing material. Thus, any repetitive description will be omitted.

According to FIG. 3A, a photosensitive sealing material may be coated on the a first peripheral area PA1 of a first substrate 100 to form a first primary line 10, and a thermal sealing material may be coated on the first peripheral area PA1 to form a second primary line 20.

Figure 5A:
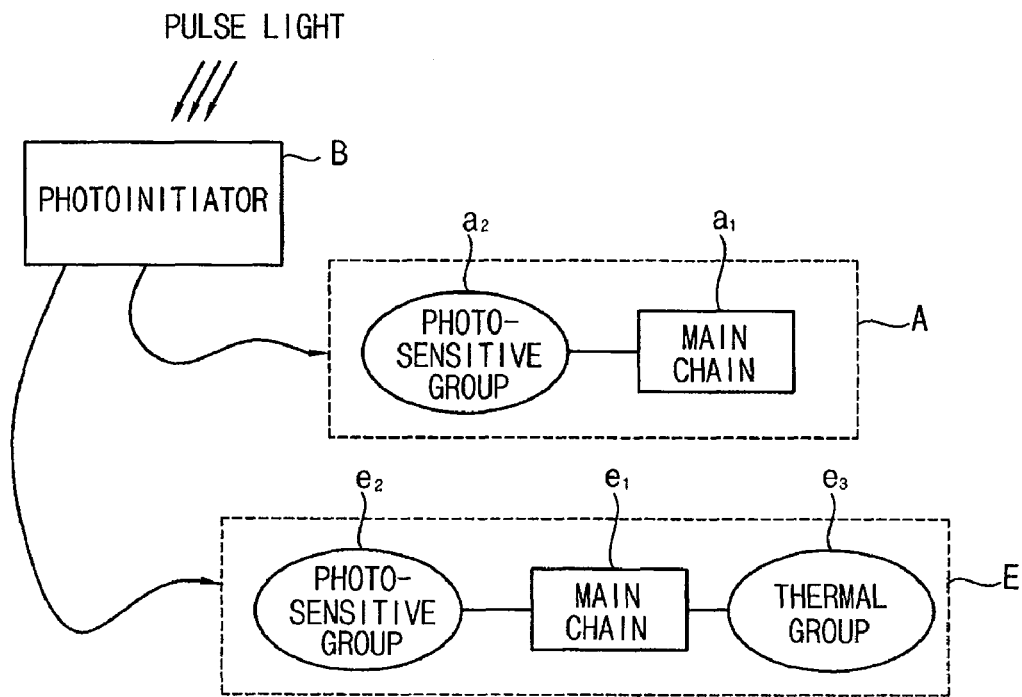
FIG. 5A illustrates a step of hardening the photosensitive sealing material in accordance with Embodiment 2.
Figure 5B:
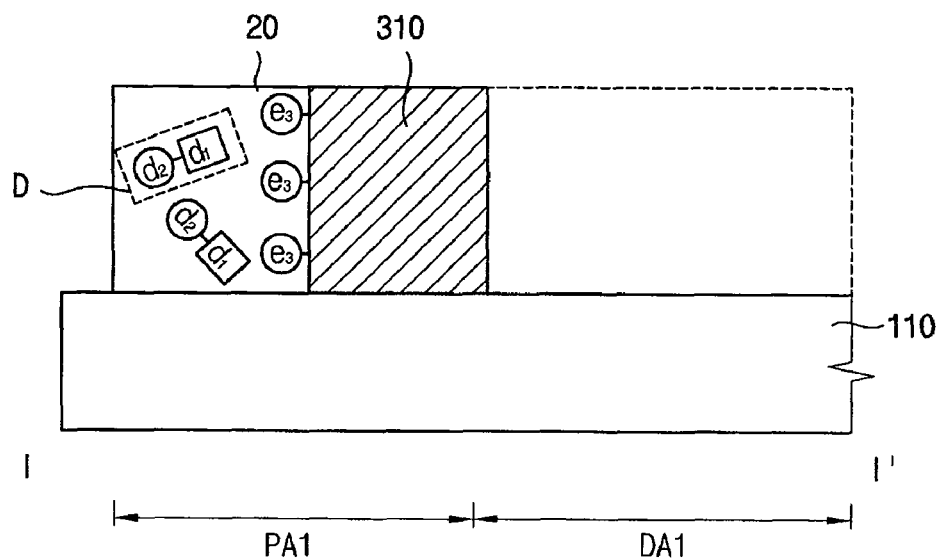
FIG. 5B is a cross-sectional view illustrating a step of hardening a photosensitive sealing material in accordance with Embodiment 2 of the present invention.

FIG. 5A illustrates a step of hardening a photosensitive sealing material in accordance with Embodiment 2, and FIG. 5B is a cross-sectional view illustrating a step of hardening a photosensitive sealing material in accordance with Embodiment 2 of the present invention.

Referring to FIG. 5A, pulse light may irradiate the first primary line 10 including the photosensitive sealing material. The photosensitive sealing material may include a photosensitive compound "A", a photoinitiator "B", and a hybrid compound "E". The photosensitive compound "A" may include a main chain "$a_1$" and a photosensitive group "$a_2$" combined with the main chain "$a_1$".

The photoinitiator "B" may absorb the photochemical reaction energy (Ex) of pulse light which is generated by a pulse laser. The photoinitiator "B" which absorbs the photochemical reaction energy (Ex) may attack the photosensitive group "$a_2$". Thus, the hardening reaction of the photosensitive compound "A" may be initiated. The photoinitiator "B" which absorbs the photochemical reaction energy (Ex) may attack the hybrid compound "E" to initiate a portion of the hardening reaction of the hybrid compound "E".

The hybrid compound "E" may include a main chain "$e_1$", a photosensitive group "$e_2$" combined with the main chain "$e_1$", and a thermal group "$e_3$" combined with the main chain "$e_1$". The photosensitive group "$e_2$" may be substantially the same as the photosensitive group "$a_2$" of the photosensitive compound "A". For example, the photosensitive group "$e_2$" may be an acryl group.

The photoinitiator "B" may attack the photosensitive group "$a_2$", and the photoinitiator "B" may attack the photosensitive group "$e_2$".

The thermal group "$e_3$" may not be reacted by the pulse light, and thus the hybrid compound "E" may not be reacted by the pulse light.

The thermal sealing material may also include the hybrid compound "E". In the thermal sealing material, the photosensitive group "$e_2$" of the hybrid compound "E" may be reacted by the photoinitiator "B" which is reacted by the pulse light. Thus, a portion of the hybrid compound "E" may participate in the hardening reaction of the main chain "$a_1$" of the photosensitive compound "A".

Referring to FIG. 5B, the photosensitive compound "A" and a portion of the hybrid compound "E" may be hardened by the photoinitiator "B" to form the photocuring material. Thus, the first seal line 310 may be formed on the first peripheral area PA1.

The second seal line 20 may include a thermal compound "D" of the thermal sealing material and the thermal group "$e_3$". The thermal group "$e_3$" may be combined with an opposing portion of the hybrid compound "E" which is combined with the photocuring material.

According to FIGS. 3C and 3D, a second substrate 200 may be opposed to the first substrate 100 including the first seal line 310, the second primary line 20, and a liquid crystal composition which is dropped on the first substrate 100. The first and second substrates 100 and 200 may be heated to form the second seal line 320 surrounding the first seal line 310. The thermal compound "D" may be hardened by the heat, and the thermal group "$e_3$" of the hybrid compound "E" which is combined with the photocuring material may be hardened with the thermal compound "D". Thus, the display device 500 shown in FIGS. 1 and 2 may be manufactured.

According to some embodiments, the first seal line 310 which may serve as a dam and a spacer may be combined with the second seal line 320 by the hybrid compound "E". Thus, adhesive strength between the sealant 300 including the first and second seal lines 310 and 320 and the first substrate 100 may be improved, and adhesive strength between the sealant 300 and the second substrate 200 may be improved. As a result, the first and second substrates 100 and 200 may be strongly combined with each other by the sealant 300.

Embodiment 3

A display device in accordance with another embodiment is substantially the same as the display device shown in FIGS. 1 and 2. Thus, any repetitive description will be omitted.

Figure 6A:
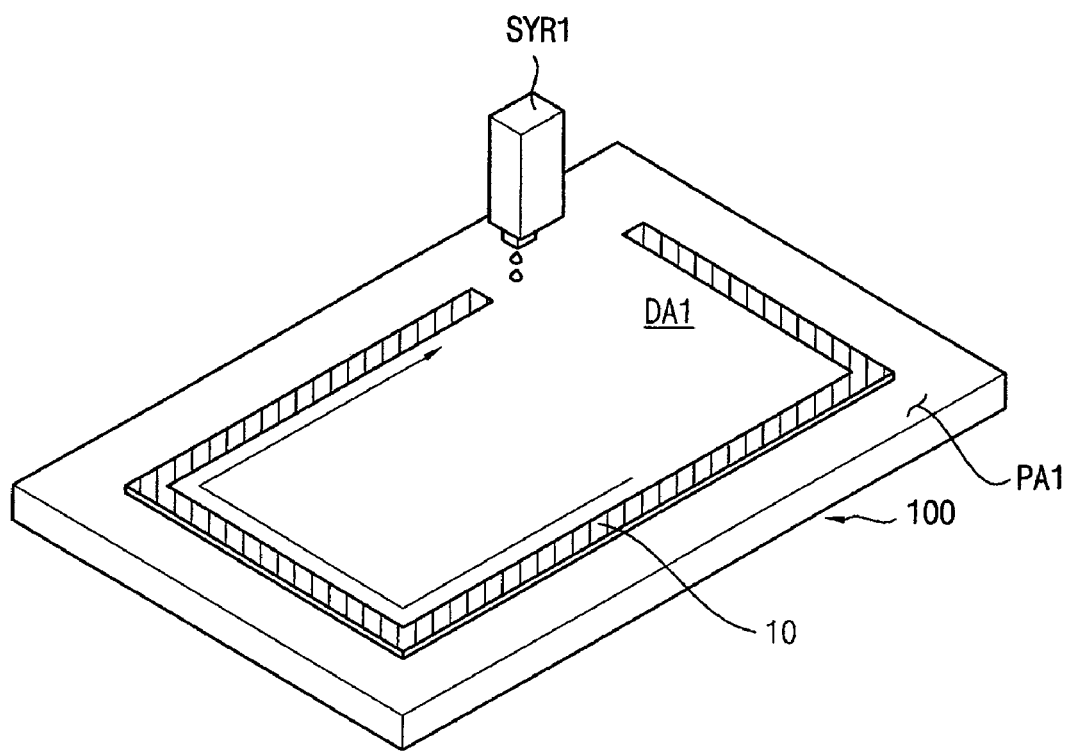
FIGS. 6A to 6C are perspective views illustrating a method of manufacturing a display device in accordance with Embodiment 3 of the present invention.
Figure 6B:
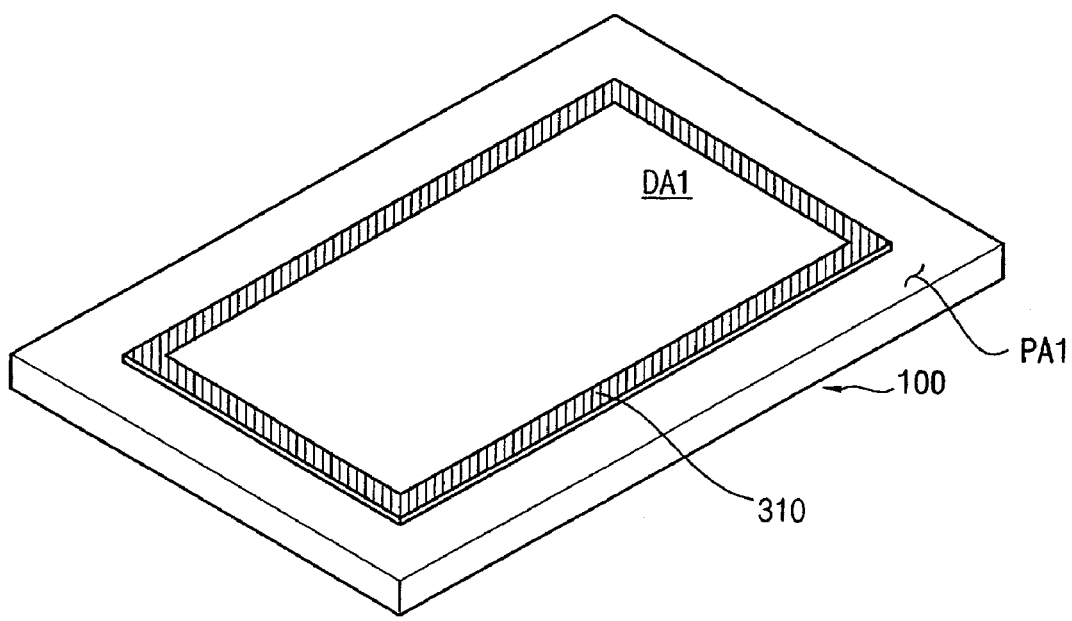
Figure 6C:
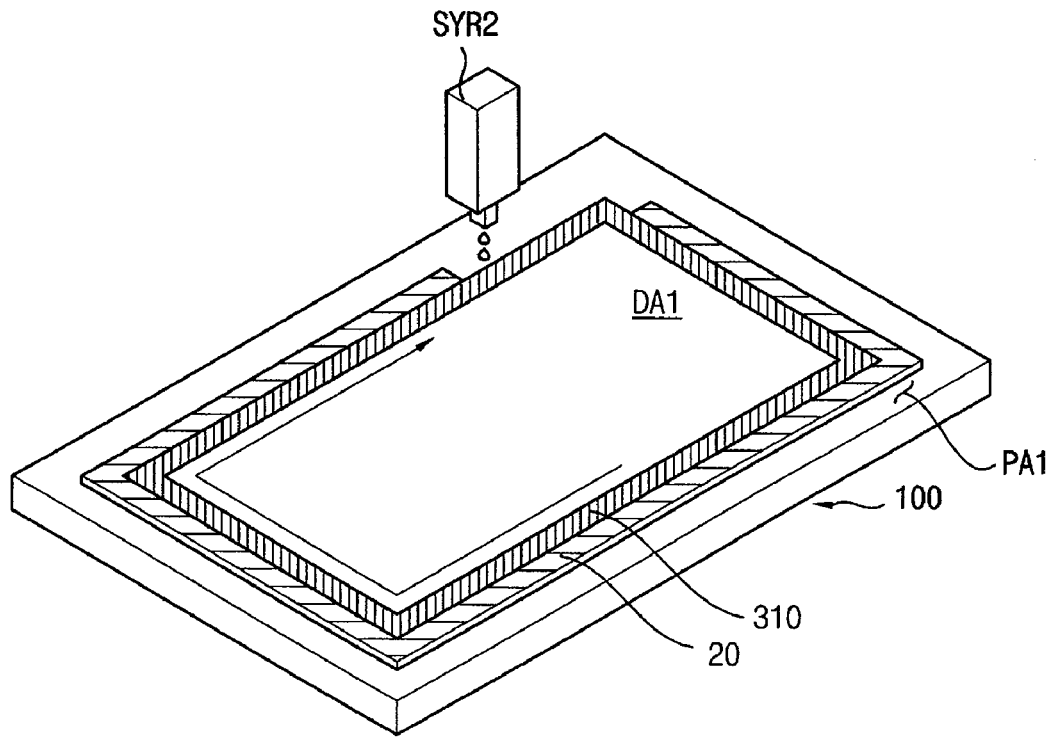

FIGS. 6A, 6B and 6C are perspective views illustrating a method of manufacturing a display device in accordance with Embodiment 3 of the present invention.

Referring to FIG. 6A, a first primary line 10 may be formed on a first peripheral area PA1 surrounding a first display area DA1 of a first substrate 100.

A first syringe SYR1 may disperse the photosensitive sealing material along the first peripheral area PA1 to form the first primary line 10. The photosensitive sealing material may include a photosensitive compound and a photoinitiator.

Referring to FIG. 6B, pulse light may be provided to the first substrate 100 including the first primary line 10 to form a first seal line 310.

The energy level of the pulse light may be lower than the photochemical reaction energy (Ex) of the photosensitive sealing material. The photochemical reaction energy (Ex) may be a photochemical reaction energy level of the photoinitiator of the photosensitive sealing material. The pulse laser may partially provide the pulse light to the first primary line 10. The photoinitiator may absorb a plurality of photons having an energy level of the pulse light, and thus the photoinitiator may absorb energy which substantially is the same as the energy level of the pulse light in total by the multiphoton absorption. Thus, the photosensitivity sealing material may be hardened to form the first seal line 310.

FIG. 6C is a perspective view illustrating a step of coating the thermal sealing material.

Referring to FIG. 6C, a second primary line 20 may be formed on the first peripheral area PA1 of the first substrate 100 along the first seal line 310.

A second syringe SYR2 may disperse the thermal sealing material along the first peripheral area PA1 to form the second primary line 20. The second primary line 20 may be formed along an edge portion of the first seal line 310 to prevent the thermal sealing material from flowing into the first display area DA1.

A second substrate 200 may face the first substrate 100 including the second primary line 20. The second substrate 200 may uniformly be spaced apart from the first substrate 100 by the first seal line 310. The first and second substrates 100 and 200 may be heated to harden the second primary line 20, and thus a second seal line 320 may be formed. Thus, the first and second substrates 100 and 200 may be combined by a sealant 300 including the first and second seal lines 310 and 320, and the display device 500 shown in FIG. 1 may be manufactured.

Embodiment 4

A display device in accordance with another embodiment is substantially the same as the display device shown in FIGS. 1 and 2. Thus, any repetitive description will be omitted.

A method of manufacturing a display device in accordance with an embodiment is substantially the same as the method shown illustrated in Embodiment 3, except for coating a photosensitive composition and hardening the photosensitive sealing material. Thus, any repetitive description will be omitted.

Figure 7:
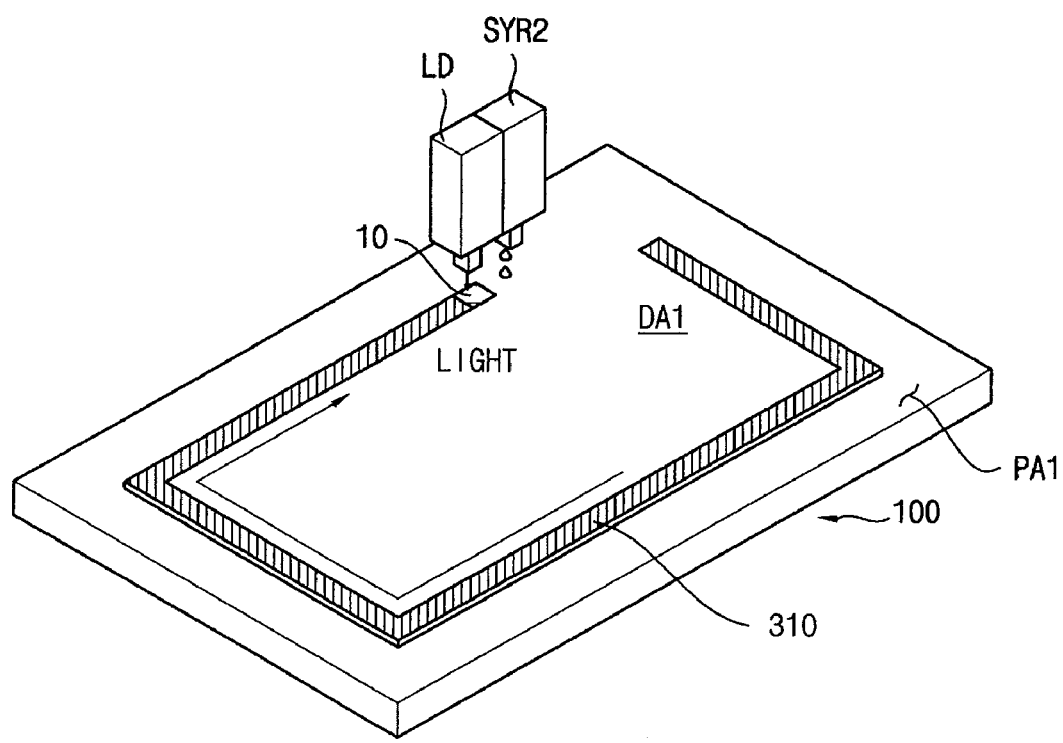
FIG. 7 is a perspective view illustrating steps of coating and hardening a photosensitive sealing material in accordance with Embodiment 4 of the present invention.

FIG. 7 is a perspective view illustrating steps of coating and hardening a photosensitive sealing material in accordance with Embodiment 4 of the present invention.

Referring to FIG. 7, a first seal line 310 may be formed on a first peripheral area PA1 surrounding a first display area DA1 of a first substrate 100.

A first syringe SYR1 containing a photosensitive sealing material may disperse the photosensitive sealing material. The photosensitive sealing material which is dispersed on the first peripheral area PA1 may receive pulse light from a light-providing portion LD connected to the first syringe SYR1. The photosensitive sealing material may be hardened by the pulse light to form a first seal line 310.

More particularly, the first syringe SYR1 may disperse the photosensitive composition to form a first primary line 10, and the light-providing portion LD may move along the first primary line 10 to provide the pulse light to the first primary line 10. The pulse light may be provided to the first primary line 10 immediately after the first primary line 10 may be formed by the first syringe SYR1. A final point of the first primary 10 may meet a starting edge point of the first seal line 310. The final point may be a point that the photosensitive sealing material is not coated any longer in the process of coating the photosensitive sealing material. The starting point of the first seal line 310 may be a point that the pulse light may initially be provided to the first primary line 10 in the process of providing the pulse light. The pulse light may be provided to the final point after meeting the final portion of the first primary line 10 and the starting point of the first seal line 310, and thus a step of forming the first seal line 310 may be completed.

According to FIGS. 3C and 3D, a second substrate 200 may face the first substrate 100 including a second primary line 20, the first seal line 310, and a dropped liquid crystal composition 30. The first and second substrates 100 and 200 may be heated to harden the second primary line 20, and thus a second seal line 320 may be formed along the first seal line 310. Thus, the first and second substrates 100 and 200 may be combined by a sealant 300 including the first and second seal lines 310 and 320, and the display device 500 shown in FIG. 1 may be manufactured.

According to some embodiments, the first seal line 310 may be formed using the first syringe SYR1 and the light-providing portion LD which are combined with each other and the first seal line 310 may be formed by partially providing the pulse light to the first primary line 10. Thus, the process of forming the first seal line 310 may be simplified.

Embodiment 5

A display device in accordance with another embodiment is substantially the same as the display device shown in FIGS. 1 and 2. Thus, any repetitive description will be omitted.

A method of manufacturing a display device in accordance with an embodiment is substantially the same as the method shown illustrated in Embodiment 1, except for coating a photosensitive composition and hardening the photosensitive sealing material. Thus, any repetitive description will be omitted.

Figure 8:
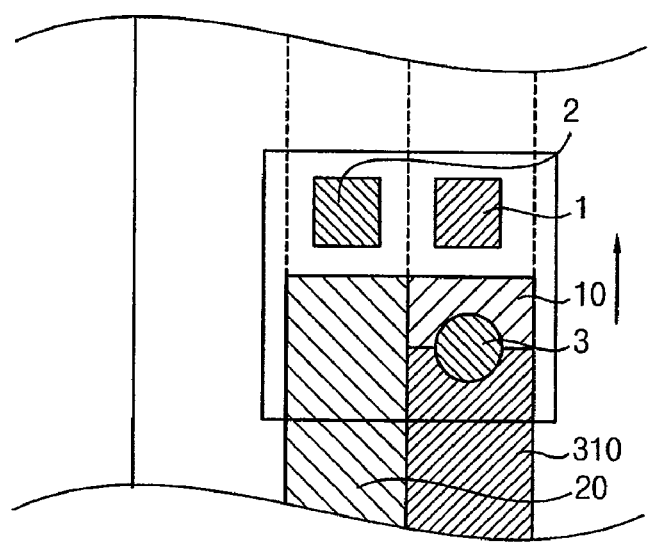
FIG. 8 is a plan view illustrating a step of coating a photosensitive sealing material and a thermal sealing material and a step of hardening the photosensitive sealing material.

FIG. 8 is a plan view illustrating a step of coating a photosensitive sealing material and a thermal sealing material and a step of hardening the photosensitive sealing material.

Referring to FIG. 8, a photosensitive sealing material and a thermal sealing material may be simultaneously coated on a first peripheral area PA1 surrounding a first display area DA1 of a first substrate 100. Thus, a first primary line 10 and a second primary line 20 may be simultaneously formed on the first peripheral area PA1, and pulse light may be provided to the first primary line 10 to form a first seal line 310.

In a dispersion device, a first injection nozzle 1 may inject the photosensitive sealing material on the first peripheral area PA1 to form the first primary line 10. A second injection nozzle 2 may inject the thermal sealing material on the first peripheral area PA1 to form the second primary line 20. The first and second primary lines 10 and 20 may be simultaneously formed.

Pulse light may be provided to the first primary line 10 by a light-providing portion 3 disposed adjacent to the first injection nozzle 1. Thus, the photosensitive sealing material may be hardened by the pulse light to form the first seal line 310.

According to FIGS. 3C and 3D, a second substrate 200 may face the first substrate 100 including the first seal line 310, the second primary line 20, and a dropped liquid crystal composition 30. The first and second substrates 100 and 200 may be heated to harden the second primary line 20, and thus a second seal line 320 may be formed along the first seal line 310. Thus, the first and second substrates 100 and 200 may be combined by a sealant 300 including the first and second seal lines 310 and 320, and the display device 500 shown in FIGS. 1 and 2 may be manufactured.

According to some embodiments, the first and second primary lines 10 and 20 may be simultaneously formed by using the dispersion device including the first injection nozzle 1, the second injection nozzle 2, and the light-providing portion 3. The pulse light may be partially provided to the first primary line 10 to be simplified. A delay between forming the first primary line 10 and forming the second primary line 20 may be minimized, and thus the thermal sealing material of the second primary line 20 may be easily prevented from flowing into the first display area DA1.

Embodiment 6

Figure 9:
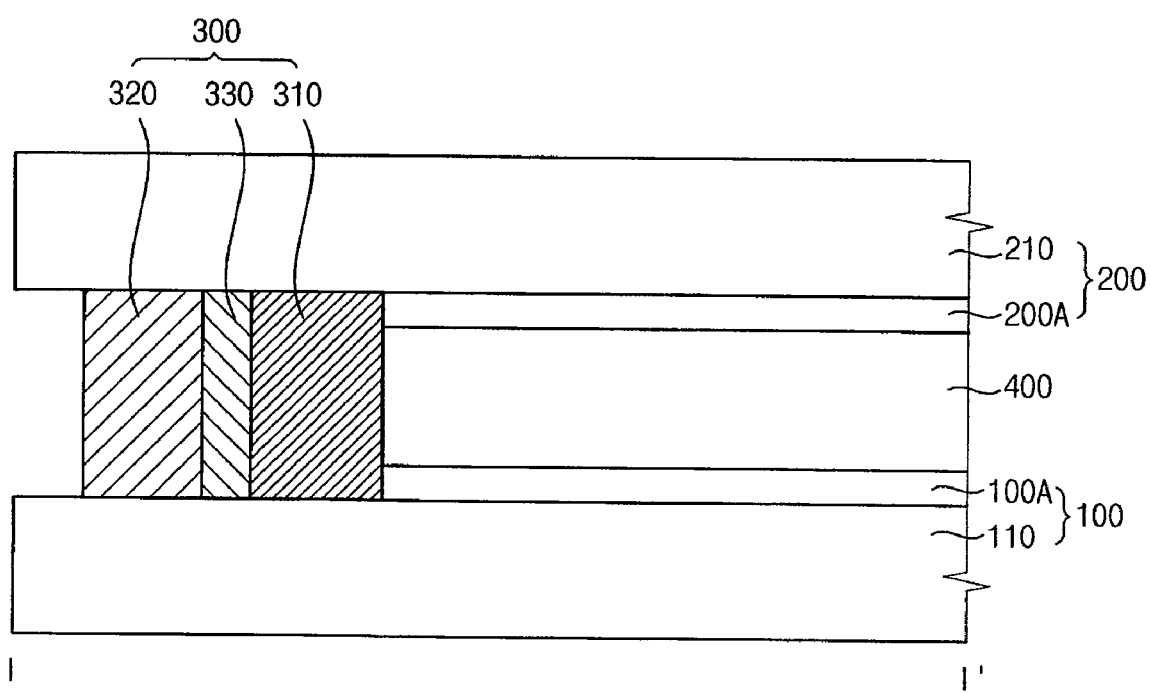
FIG. 9 is a cross-sectional view illustrating a display device in accordance with Embodiment 6 of the present invention.

FIG. 9 is a cross-sectional view illustrating a display device in accordance with Embodiment 6 of the present invention.

In FIG. 9, a display device in accordance with an embodiment is substantially the same as the display device shown in FIG. 1, except for a first seal line 310, a second seal line 320, and a mixing portion 330. Thus, any repetitive description will be omitted.

Referring to FIG. 9, the display device includes a first substrate 100, a second substrate 200, a sealant 300, and a liquid crystal layer 400.

The first substrate 100 may include an array layer 100A which is formed on a first base substrate 110. The array layer 100A may include a gate line GL, a data line DL, a TFT, and a pixel electrode 170. The second substrate 200 may include a color layer 200A which is formed on a second base substrate 210. The color layer 200A may include a black matrix pattern 220, a color filter 230, and a common electrode layer 250.

The sealant 300 may include a first seal line 310, a second seal line 320, and a mixing portion 330. The first seal line 310 may include a photocuring material, the second seal line 320 may include a thermosetting material, and the mixing portion 330 may include the photocuring material and the thermosetting material.

The photocuring material of the first seal line 310 may be formed by hardening a photosensitive sealing material using multiphoton absorption. The thermosetting material of the second seal line 320 may be formed by hardening a thermal sealing material. The first seal line 310 may surround an edge portion of the liquid crystal layer 400 and directly contact a liquid crystal composition 30 of the liquid crystal layer 400.

The mixing portion 330 is mixed with the photocuring material and the thermosetting material. In mixing a photosensitive sealing material and a thermal sealing material, the photosensitive sealing material may be hardened by the multiphoton absorption and the thermal sealing material may be hardened by heat. The sealant 300 including the mixing portion 330 may be strongly combined with the first substrate 100 and the second substrate 200.

Figure 10A:
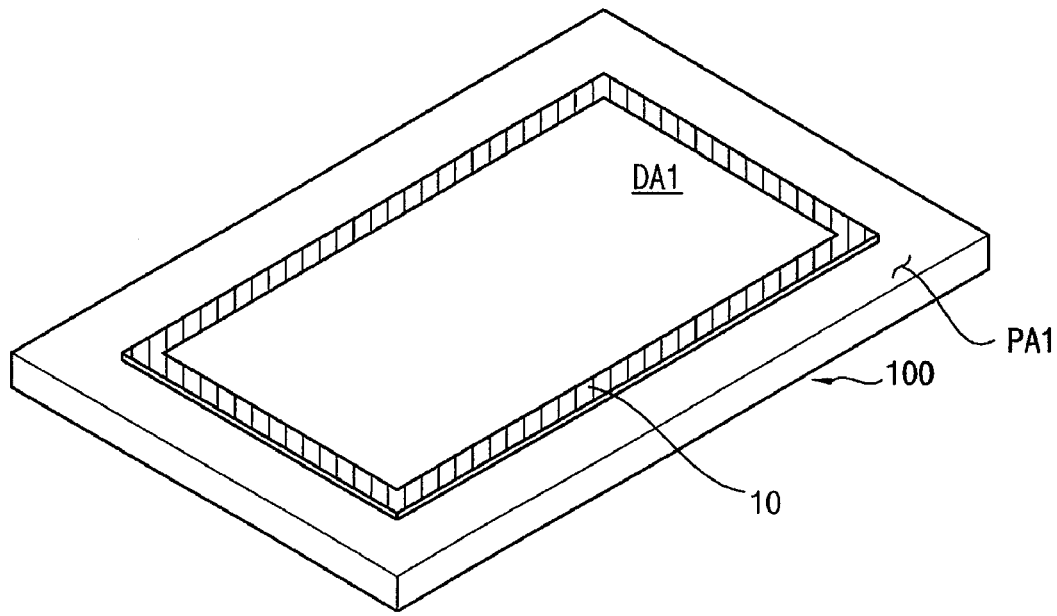
FIGS. 10A and 10B are perspective views illustrating a method of manufacturing the display device shown in FIG. 9.
Figure 10B:
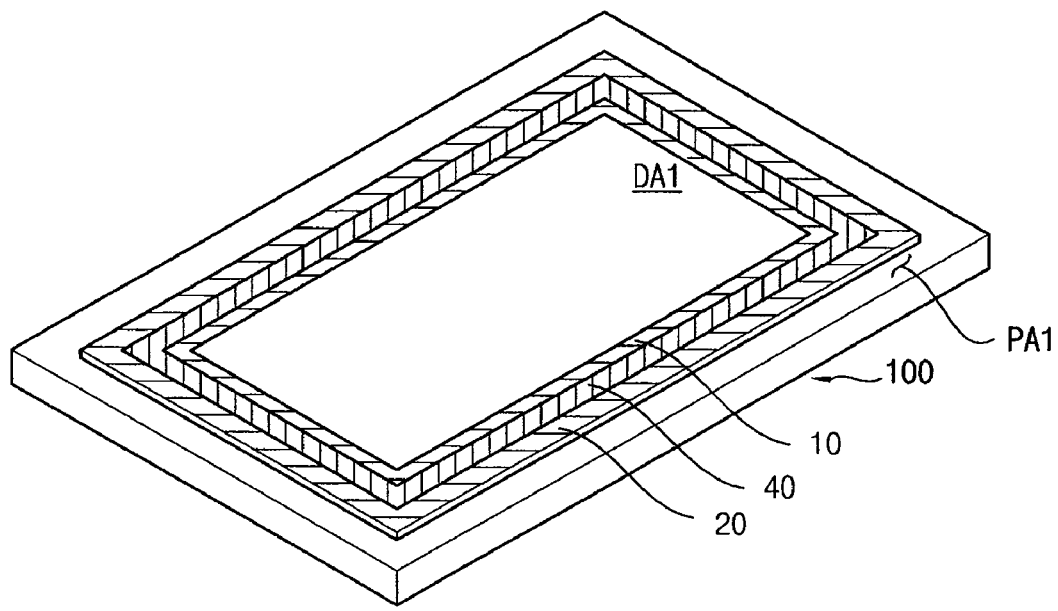

FIGS. 10A and 10B are perspective views illustrating a method of manufacturing the display device shown in FIG. 9.

Referring to FIG. 10A, the photosensitive sealing material may be coated on the first peripheral area PA1 to form a first primary line 10.

The first primary line 10 may surround the display area DA1 and be formed on the first peripheral area PA1. The photosensitive sealing material may include a photosensitive compound and a photoinitiator.

Referring to 10B, the thermal sealing material may be coated on the first peripheral area PA1 including the first primary line 10 to form a second primary line 20 and a primary mixing portion 40.

The second primary line 20 may be formed along the first primary line 10 on the first peripheral area PA1.

The primary mixing portion 40 may be formed on an area overlapping the second primary line 20 with the first primary line 10 while the second primary line 20 is formed on the area. The photosensitive sealing material of the first primary line 10 may be mixed with the thermal sealing material of the second primary line 20 to form the primary mixing portion 40.

Pulse light may be partially provided to the first primary line 10 and the primary mixing portion 40 of the first substrate 100 including the first and second primary lines 10 and 20 and the primary mixing portion 40, and thus the first seal line 310 and a partial-mixing portion (not shown) may be formed. The first seal line 310 may include the photocuring material which is formed by hardening the photosensitive sealing material. The partial-mixing portion may include the photocuring material and the thermal sealing material.

A second substrate 200 may face the first substrate 100 including the first seal line 310, the partial-mixing portion, the second primary line 20, and a dropped liquid crystal composition 30. The first and second substrates 100 and 200 may be heated to harden the second primary line 20 and the partial-mixing portion, and thus the second seal line 320 and the mixing portion 320 may be formed. Thus, the second seal line 320 may include the thermosetting material and the mixing portion 330 may include the photocuring material and the thermosetting material. The sealant 300 including the mixing portion 330 may be strongly combined with the first substrate 100 and the second substrate 200.

Embodiment 7

Figure 11:
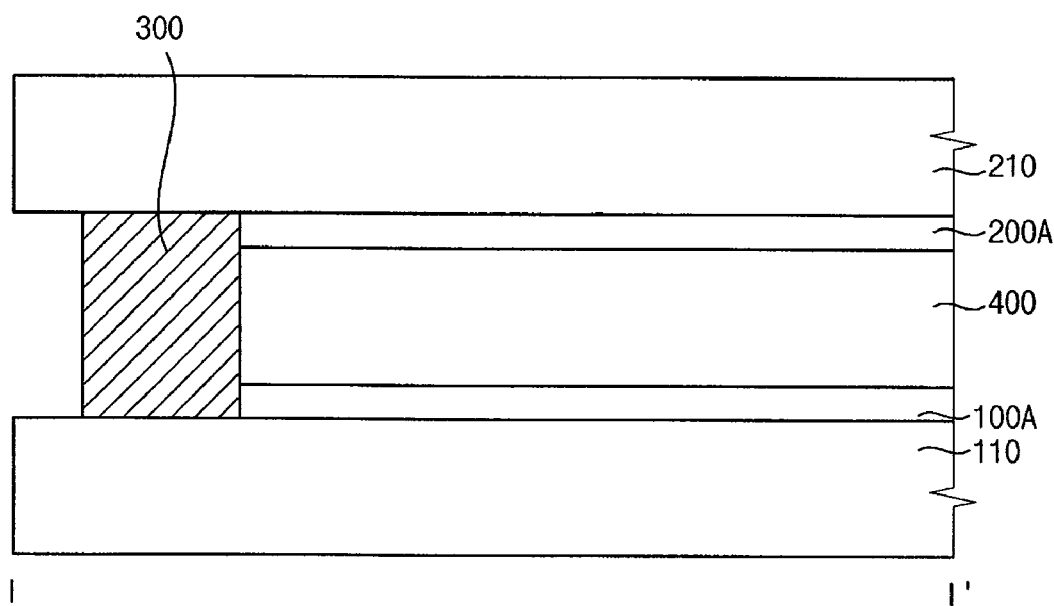
FIG. 11 is a cross-sectional view illustrating a display device in accordance with Embodiment 7 of the present invention.

FIG. 11 is a cross-sectional view illustrating a display device in accordance with Embodiment 7 of the present invention.

In FIG. 11, a display device in accordance with an embodiment is substantially the same as the display device shown in FIG. 1, except for a sealant 300. Thus, any repetitive description will be omitted.

Referring to FIG. 11, the display device includes a first substrate 100, a second substrate 200, a sealant 300, and a liquid crystal layer 400.

The first substrate 100 may include an array layer 100A which is formed on a first base substrate 110. The array layer 100A may include a gate line GL, a data line DL, a TFT, and a pixel electrode 170. The second substrate 200 may include a color layer 200A which is formed on a second base substrate 210. The color layer 200A may include a black matrix pattern 220, a color filter 230, and a common electrode layer 250.

The sealant 300 may be formed on a first peripheral area PA1 surrounding a display area DA1 which is formed on the array layer 100A. The sealant 300 may include a photocuring material and a thermosetting material. The photocuring material and the thermosetting material which are mixed with each other may define the sealant 300. The photocuring material may be formed by hardening a photosensitive sealing material using multiphoton absorption. The thermosetting material may be formed by hardening a thermal sealing material. A portion of the sealant 300 may be hardened by multiphoton absorption and a remaining portion of the sealant 300 may be hardened by heat, and thus the sealant 300 may be formed.

According to some embodiments, contamination of the liquid crystal layer 400 may be prevented from a photoinitiator in the photosensitive sealing material, because the photosensitive sealant may be hardened before dropping a liquid crystal composition of the liquid crystal layer 400. The photocuring material is formed from the photosensitive sealing material which receives pulse light having a lower energy level than a photochemical energy level of the photosensitive sealing material, and thus alteration of the circuits or materials formed on the display area and the peripheral area may be prevented by hardening the sealant. Additionally, the formation of the UV blocking mask, which is expensive, may be omitted, and thus the productivity of the display device may be improved.

Figure 12A:
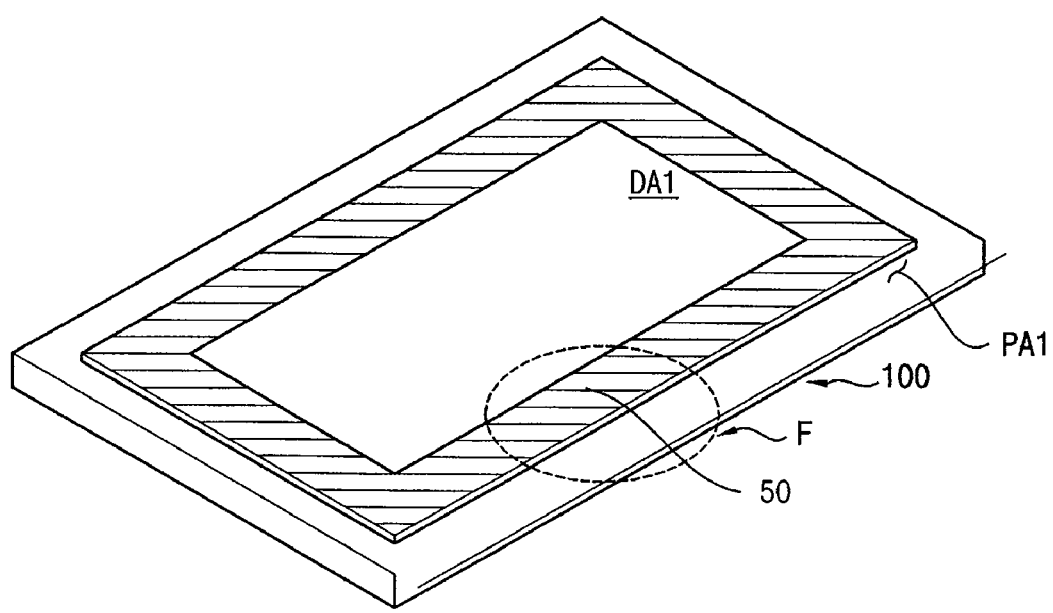
FIG. 12A is a perspective view illustrating a method of manufacturing the display device shown in FIG. 11.

FIG. 12A is a perspective view illustrating a method of manufacturing the display device shown in FIG. 11, and FIGS. 12B, 12C and 12D are views illustrating a method of manufacturing the display device shown in FIG. 11.

Referring to FIG. 12A, a mixing composition including the photosensitive sealing material and the thermal sealing material may be coated on the first peripheral area PA1 of the first substrate 100 to form a third primary line 50. At least one of the photosensitive sealing material and the thermal sealing material may further include a hybrid compound, and thus the mixing composition may include the hybrid compound.

The third primary line 50 may be formed on the first peripheral area PA1 surrounding the first display area DA1. In the first peripheral area PA1, the photosensitive sealing material, thermal sealing material, and the hybrid compound may randomly be distributed on the first peripheral area PA1.

Figure 12B:
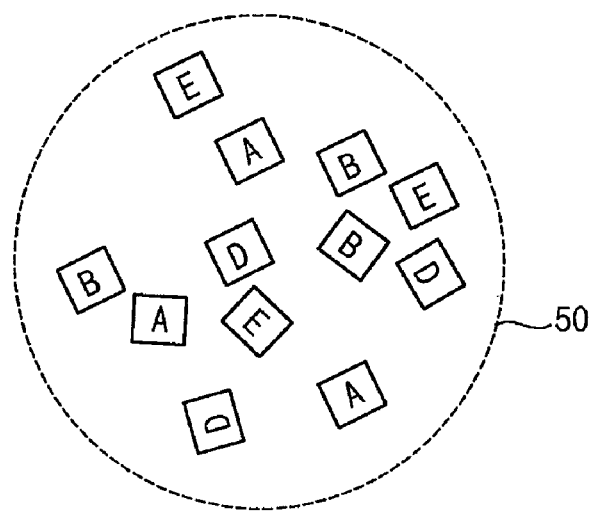
FIGS. 12B to 12D are plan views illustrating a method of manufacturing the display device shown in FIG. 11.

FIG. 12B is a conceptual view of an enlarged "F" part of the third primary line shown in FIG. 12A.

Referring to FIG. 12B, the third primary line 50 may include a photosensitive compound "A" and a photoinitiator "B of the photosensitive sealing material, a thermal compound "B" of the thermal sealing material, and the hybrid compound "E" which are randomly distributed to each other.

The photosensitive compound "A" may include a photosensitive group. The photosensitive compound "A" may be hardened by the photoinitiator "B". The photoinitiator "B" may absorb a photochemical reaction energy using multiphoton absorption. The hybrid compound "E" may include the photosensitive group of the photosensitive compound "A" and the thermal group of the thermal compound "D".

Figure 12C:
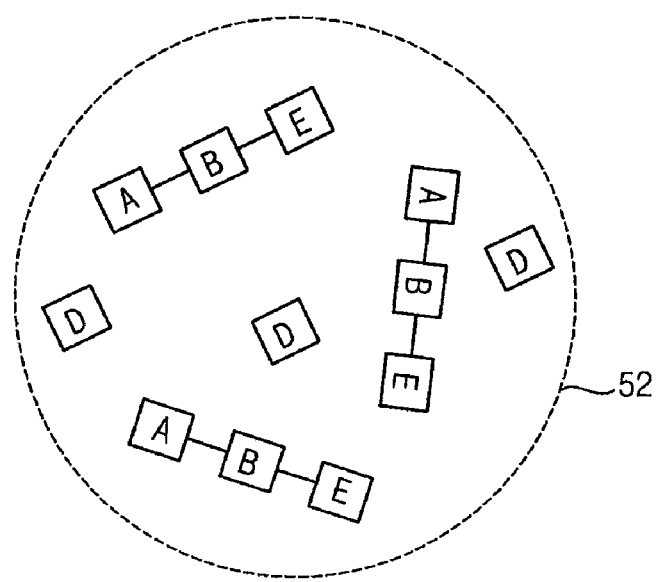

Referring to FIG. 12C, pulse light may be provided to the third primary line 50, and thus the photosensitive compound "A", the photoinitiator "B", and the hybrid compound "E" may react to form a partial-mixing portion 52.

Particularly, the photoinitiator "B" may absorb multiphotons by the pulse light to be initiated to a hardening reaction of the photosensitive group in the photosensitive compound "A" and the hybrid compound "E". The photosensitive compound "A" may be reacted with the photoinitiator "B". The photosensitive compound "A" which is reacted with the photoinitiator "B" may be combined with an edge portion of the hybrid compound "E". The edge portion of the hybrid compound "E" may be a portion including the photosensitive group. The partial-mixing portion 52 may include the photocuring material formed by combining the photosensitive compound "A" and the photoinitiator "B".

A liquid crystal composition may be dropped on the first display area DA1 of the first substrate 100 including the partial-mixing portion 52. The partial-mixing portion 52 may not include a residual photoinitiator "B" and the photosensitive sealing material may be entirely hardened, and thus contamination of the liquid crystal composition may be prevented from the photoinitiator "B" or the photosensitive group.

Figure 12D:
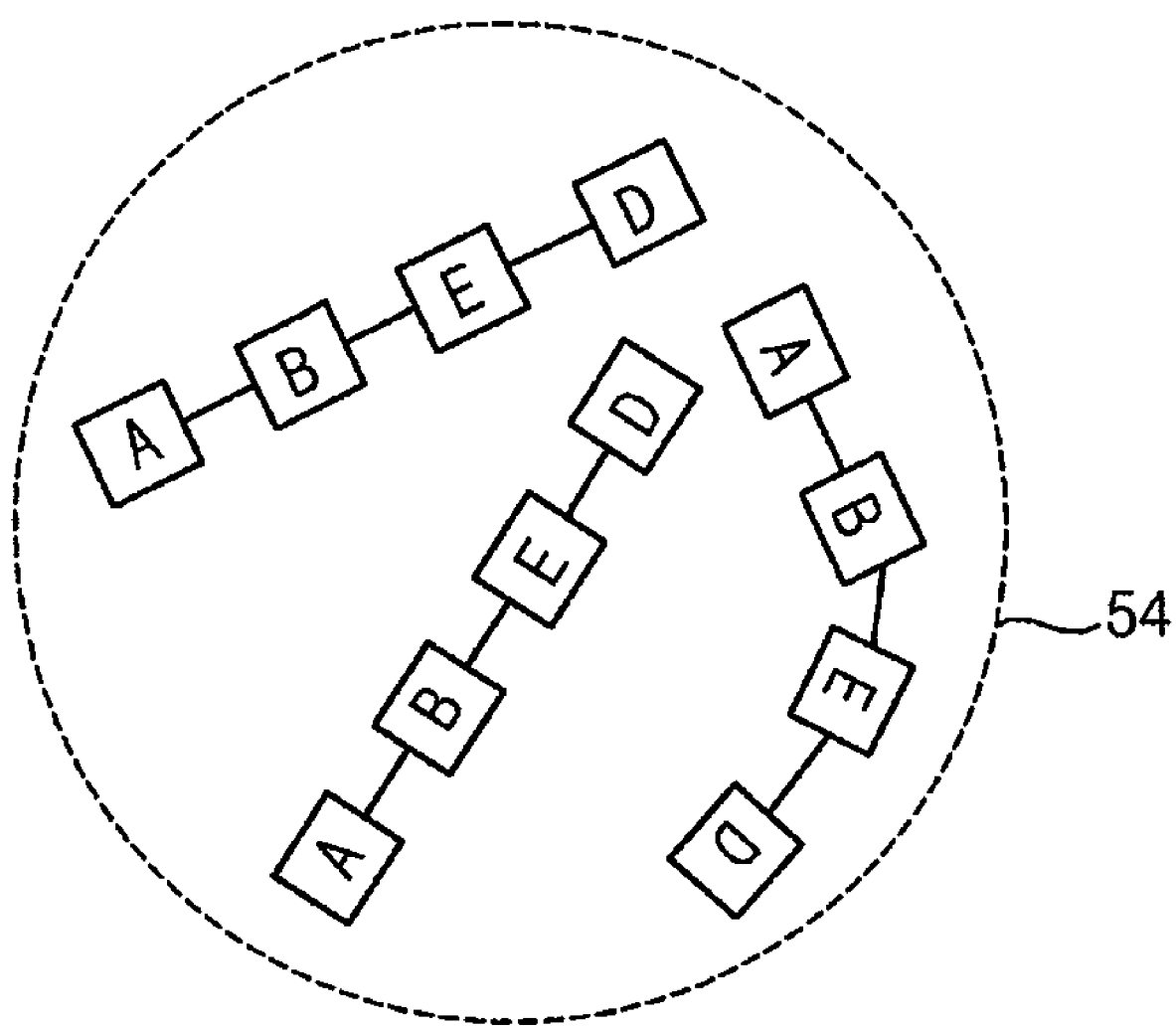

Referring to FIG. 12D, a second substrate 200 may face the first substrate 100 including the partial-mixing portion 52 and a dropped liquid crystal composition. The first and second substrates 100 and 200 may be heated to harden the thermal compound "D", and thus the thermosetting material may be formed.

The thermosetting material may be formed by combining the thermal compounds "D" with each other or combining the thermal compound "D" with the thermal group which is an opposing edge portion of the hybrid compound "E".

The thermosetting material may be formed to form the sealant 300 including the photocuring material and the thermosetting material. The sealant 300 may be strongly combined with the first substrate 100 and the second substrate 200 by the hybrid compound "E".

In some embodiments, after a photocuring material and a thermal sealing material may be formed on a second substrate including a color layer, a liquid crystal composition may be dropped on the second substrate. A first substrate including an array layer may face the second substrate including a photocuring material, a thermal sealing material, and a dropped liquid crystal composition, and thus the thermal sealing material may be hardened to a thermosetting material. Thus, the first and second substrates may be combined by a sealant including the photocuring material and the thermosetting material.

According to some example embodiments of the present invention, contamination of the liquid crystal composition may be prevented from the sealant, and thus generating stains in the display device may be prevented. Thus, the reliability of manufacturing the display device may be improved and the display quality may be improved.

Moreover, the photocuring material is formed from the photosensitive sealing material which receives pulse light having a lower energy level than a photochemical energy level of the photosensitive sealing material, and thus alteration of the circuits or materials formed on the display area and the peripheral area may be prevented by hardening the sealant. Formation of the UV blocking mask, which is expensive, may be omitted, and thus the productivity of the display device may be improved.

Additionally, the seal line including the photocuring material may serve as the dam of the liquid crystal composition and as the cell gap spacer of the first and second substrates. Thus, the margin of dropping the liquid crystal composition may be improved.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display device, comprising:
    a first substrate including a sealant formed on a peripheral area surrounding a display area including a plurality of pixel portions, the sealant including a photocuring material hardened by multiphoton absorption and a thermosetting material hardened by heat; and
    a second substrate opposite to the first substrate, the second substrate attached to the first substrate by the sealant,
    wherein the sealant comprises:
        a first seal line comprising the photocuring material; and
        a second seal line comprising the thermosetting material, the second seal line formed along an edge of the first seal line, and
    wherein the sealant further comprises a mixing portion formed between the first and second seal lines, and the photocuring material is mixed with the thermosetting material in the mixing portion.

2. The display device of claim 1, wherein the photocuring material is formed from a photosensitive sealing material comprising a photosensitive compound and a photoinitiator.

3. The display device of claim 2, wherein the photosensitive compound comprises an acrylic resin.

4. The display device of claim 1, wherein the thermosetting material is formed from a thermal sealing material comprising an epoxy resin.

5. A method of manufacturing a display device, the method comprising:
    coating a photosensitive sealing material on a peripheral area surrounding a display area of a first substrate;
    coating a thermal sealing material on the peripheral area of the first substrate;
    hardening the photosensitive sealing material using multiphoton absorption;
    providing a liquid crystal on the display area of the first substrate comprising hardened photosensitive sealing material and the thermal sealing material;
    preparing a second substrate facing the first substrate to interpose the liquid crystal composition between the first and second substrates; and
    hardening the thermal sealing material interposed between the first and the second substrates.

6. The method of claim 5, wherein the photosensitive sealing material comprises:
    a photosensitive compound comprising a photosensitive group; and
    a photoinitiator which initiates the multiphoton absorption of the photosensitive compound to harden the photosensitive compound.

7. The method of claim 6, wherein at least one of the photosensitive sealing material and the thermal sealing material further comprises a hybrid compound comprising a photosensitive group and a thermal group.

8. The method of claim 5, wherein the photosensitive compound of the photosensitive sealing material comprises an acrylic resin, and
    the thermal sealing material comprises an epoxy resin.

9. The method of claim 8, wherein the photosensitive sealing composition is hardened by irradiating pulse light into the photosensitive sealing material to absorb multiphotons, and the pulse light having a lower energy level than a photochemical energy level of the photosensitive sealing material.

10. The method of claim 9, wherein the pulse light has a wavelength in a range of about 400 nm to about 1,200 nm.

11. The method of claim 5, wherein the thermal sealing material is coated by forming the thermal sealing material along an edge portion of a region, in which the photosensitive sealing material is formed, and the thermal sealing material is adjacent to the edge portion of the region.

12. The method of claim 5, wherein the thermal sealing material is coated by forming the thermal sealing material along an edge portion of a region, in which the photosensitive sealing material is formed, and the thermal sealing material is overlapped with a portion of the photosensitive composition.

13. The method of claim 5, wherein the photosensitive sealing material and thermal sealing material are simultaneously coated on the first substrate with the thermal sealing material.

14. The method of claim 5, wherein the photosensitive sealing material comprises an acrylic resin and a photoinitiator.

15. The method of claim 5, wherein the thermal sealing material comprises an epoxy resin.

16. A method of manufacturing a display device, the method comprising:
    coating a mixing composition on a peripheral area surrounding a display area of a first substrate, the mixing composition comprising a photosensitive sealing material and a thermal sealing material;
    hardening the photosensitive sealing material of the mixing composition, which is coated on the first substrate, using multiphoton absorption;
    providing a liquid crystal in the display area of the first substrate comprising hardened photosensitive sealing material and the thermal sealing material;
    preparing a second substrate opposite to the first substrate, the liquid crystal being formed between the first and second substrates; and
    hardening the thermal sealing material interposed between the first and the second substrates.

17. The method of claim 16, wherein the mixing composition further comprises a hybrid compound comprising a photosensitive group and a thermal group.

18. The method of claim 16, wherein the photosensitive sealing material comprises a photosensitive compound and a photoinitiator, and the photosensitive compound comprising a photosensitive group.

19. The method of claim 18, wherein the photosensitive compound comprises an acrylic resin.

20. The method of claim 16, wherein the thermal sealing material comprises an epoxy resin.

21. The display device of claim 1, wherein a portion of the first seal line overlaps the second seal line to form the mixing portion.

22. The display device of claim 1, further comprising a hybrid compound including a photosensitive group in the first seal line and a thermal group in the second seal line.

* * * * *